US007970614B2

(12) United States Patent
Kim et al.

(10) Patent No.: US 7,970,614 B2
(45) Date of Patent: Jun. 28, 2011

(54) CONTINUOUS ADAPTATION IN DETECTION SYSTEMS VIA SELF-TUNING FROM TARGET POPULATION SUBSETS

(75) Inventors: Janice J. Kim, White Plains, NY (US); Jiri Navratil, Cortlandt Manor, NY (US); Jason W. Pelecanos, Ossining, NY (US); Ganesh N. Ramaswamy, Mohegan Lake, NY (US)

(73) Assignee: Nuance Communications, Inc., Burlington, MA (US)

( * ) Notice: Subject to any disclaimer, the term of this patent is extended or adjusted under 35 U.S.C. 154(b) by 1046 days.

(21) Appl. No.: 11/745,745

(22) Filed: May 8, 2007

(65) Prior Publication Data

US 2008/0281596 A1 Nov. 13, 2008

(51) Int. Cl.
*G10L 15/14* (2006.01)
(52) U.S. Cl. ............... 704/256.2; 704/256; 704/240; 704/248; 704/246
(58) Field of Classification Search .......... 704/256, 704/256.2, 240, 242, 248, 246
See application file for complete search history.

(56) References Cited

U.S. PATENT DOCUMENTS

| | | | | |
|---|---|---|---|---|
| 5,218,668 A | * | 6/1993 | Higgins et al. | 704/200 |
| 5,440,662 A | * | 8/1995 | Sukkar | 704/236 |
| 5,740,318 A | * | 4/1998 | Naito et al. | 704/253 |
| 5,842,165 A | * | 11/1998 | Raman et al. | 704/255 |
| 6,029,124 A | * | 2/2000 | Gillick et al. | 704/200 |
| 6,076,054 A | * | 6/2000 | Vysotsky et al. | 704/240 |
| 6,182,037 B1 | * | 1/2001 | Maes | 704/247 |
| 6,226,612 B1 | * | 5/2001 | Srenger et al. | 704/256.2 |
| 6,529,902 B1 | * | 3/2003 | Kanevsky et al. | 1/1 |
| 6,785,672 B1 | * | 8/2004 | Floratos et al. | 707/748 |
| 2009/0119103 A1 | * | 5/2009 | Gerl et al. | 704/243 |

OTHER PUBLICATIONS

PCT/US11/20495 (US PCT application).*
M. Przybocki, A. Martin, "NIST speaker recognition evaluation—1997", Proc. RLA2C, Avignon, Apr. 20-23, 1998, pp. 120-123.
P. Kenny, G. Boulianne, P. Ouellet, P. Dumouchel, "Improvements in Factor Analysis based Speaker Verification," Proc. of the ICASSP 2006, Toulouse, France, May 2006, pp. I-113 to I-116.

(Continued)

*Primary Examiner* — Vijay B Chawan
(74) *Attorney, Agent, or Firm* — Wolf, Greenfield & Sacks, P.C.

(57) ABSTRACT

The present invention provides a system and method for treating distortion propagated though a detection system. The system includes a compensation module that compensates for untreated distortions propagating through the detection compensation system, a user model pool that comprises of a plurality of model sets, and a model selector that selects at least one model set from plurality of model sets in the user model pool. The compensation is accomplished by continually producing scores distributed according to a prescribed distribution for the at least one model set and mitigating the adverse effects of the scores being distorted and lying off a pre-set operating point.

The method for treating distortion propagated though a detection system includes receiving a signal from a remote device, and compensating the signal for untreated distortions. The compensation includes selecting at least one relevant model set from a plurality of model sets, producing scores distributed according to a pre-described distribution for the at least one model set, and mitigating the adverse effect of the scores being distorted by rejecting a signal if it lies off a preset operating point.

18 Claims, 2 Drawing Sheets

OTHER PUBLICATIONS

R. Auckenthaler, et al., "Score normalization for text-independent speaker verification systems," Digital Signal Processing 10, 42-54, 2000.

D. A. Reynolds, "Comparison of background normalization methods for text-independent speaker verification", Proc. Eurospeech, 1997, pp. 963-966.

J. Pelecanos, S. Sridharan, "Feature warping for robust speaker verification," Proc. Speaker Odyssey 2001, Crete, Greece, Jun. 2001.

J. Pelecanos, J. Navratil, G. N. Ramaswamy "Addressing channel mismatch through speaker discriminative transforms," IEEE Odyssey Speaker and Language Recognition Workshop, Puerto Rico, Jun. 2006.

PCT/US2011/20495, filing date Jan. 7, 2011, Morales et al.

* cited by examiner

CONTINUOUS ADAPTATION IN DETECTION SYSTEMS VIA SELF-TUNING FROM TARGET POPULATION SUBSETS

BACKGROUND OF THE INVENTION

1. Field of the Invention

This invention generally relates to methods and apparatus for detection of certain events in signals and particularly to a continuous adaptation and a compensation mechanism such that untreated distortions propagating through the detection system are mitigated.

2. Description of Background

Currently, detection systems generally consist of a multitude of components whose precise specification depends upon the nature of the detection problem. The task of detection involves an automatic verification of a hypothesis imposed on the contents of an observed signal with respect to a reference signal. For example, given an excerpt of a speech recording (signal), a hypothesis might be as follows: "the excerpt is spoken in German," where the class German is represented by a reference recording (reference signal), in other words, two input signals are examined under the hypothesis that they contain the same relevant information; hence the example can he reworded as "is the test excerpt spoken in the same language as the reference recording?" There are two possible outcomes in any detection task, namely "acceptance" or "rejection" of the hypothesis.

Detection systems in real-world application race a variety of challenges. A major challenge that is the subject of interest in the present invention is the mismatch due to variable noise conditions. Due to various real-world phenomena the incoming signals are distorted by noise to a greater or lesser degree. Besides the fact that the noise has an adverse Impact on the processing of the particular signal, the difference between the noise from one signal to another (i.e. noise causing mismatch) is just as problematic to deal with. For instance, in the above example, the reference speech recording (for German) might have been recorded using a landline telephone apparatus with relatively little background noise; but the test excerpt might have been recorded over a cellular telephone network from an acoustically noisy environment. In that case the mismatch between these two recording conditions causes a considerable problem in comparing the two signals. Mismatched conditions have been identified as one of the major challenges for research in pattern recognition and detection, in the example of speaker detection.

There are a variety of techniques that address the effects of noise, distortions, and mismatch between the test and the reference signal in detection technology (e.g. in speaker detection. These may be categorized according to the component in the system upon which they act, e.g. in which functional block (see FIG. 1) their effect applies: 1) feature extraction level (e.g. by transforming the features using a non-linear transform to mitigate mismatch), 2) modeling level (e.g. by transforming model parameters to reduce variations caused by mismatch, 3) matcher (score) level.

In spite of the various techniques addressing linear and non-linear distortions, a certain (and typically considerable) degree of residual distortions remain in the processing pipeline due to unpredictable conditions and as such propagate through the system. Their effect is reflected in an undesirable distortion in the resulting test score (Matcher 13 level). The distortion is in general non-linear. This distortion is viewed as a stochastic process.

In most practical systems it desirable to maintain a single common decision threshold that is applied on the matcher score. However, distortions (viewed here as a stochastic process) cause a change in the overall score distribution—in the simplest ease causing a shift or, in the complex case, causing reshaping of the distribution which results in the threshold to lie off its correct operating point thus leading to an increase in error rates.

SUMMARY OF THE INVENTION

Embodiments of the present invention provide a system and method for treating distortion propagated though a detection system. Briefly described, in architecture, one embodiment of the system, among others, can be implemented as follows. The system includes a compensation module that compensates for untreated distortions propagating through the detection compensation system, a user model pool that comprises of a plurality of model sets, and a model selector that selects at least one model set from plurality of model sets in the user model pool. The compensation is accomplished by continually producing scores distributed according to a prescribed distribution for the at least one model set and mitigating the adverse effects of the scores being distorted and lying off a pre-set operating point.

Embodiment of the present invention can also be viewed as providing methods for controlling diagnostic functions on a remote device. In this regard, one embodiment of such a method, among others, can be broadly summarized by the following steps. The method for treating distortion propagated though a detection system includes receiving a signal from a remote device, and compensating the signal for untreated distortions. The compensation includes selecting at least one relevant model set from a plurality of model sets, producing scores distributed according to a pre-described distribution for the at least one model set, and mitigating the adverse effect of the scores being distorted by rejecting a signal if it lies off a preset operating point.

Additional features and advantages are realized through, the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The invention addresses problems with detection system accuracy adversely impacted by mismatched conditions. The application of the presented method results in normalizing the detection system behavior in the sense that it continually produces scores distributed according to a prescribed canonical distribution (e.g. centered around a predetermined value on the score axis) and hence mitigates the adverse effects of scores being distorted and lying off the pre-set operating point (as defined by the threshold). The technique achieves this by continually using the most relevant other-than-target models (for example, other enrolled speakers in a speaker verification system) and by deriving compensation from scores generated by such selected models.

Figure 1:
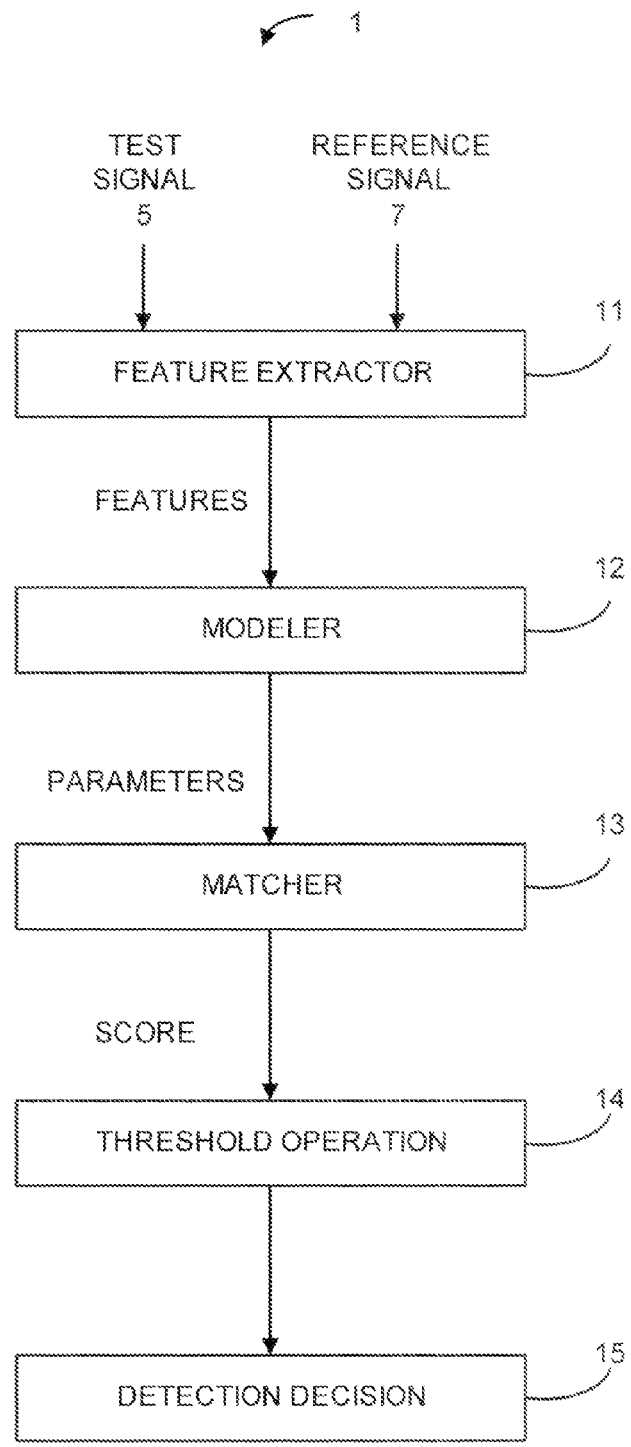
FIG. 1 illustrates one example of the general structure of a detection system of the prior art

Currently, detection systems generally will consist of the following general functional blocks (FIG. 1). These include a feature extractor, modeler, matcher and a thresholder. The feature extractor 11 processes the incoming signal such that the irrelevant and redundant information is suppressed. Only information (features) essential for solving the given detection problem is retained. The relevant information is the test signal and the reference signal input.

In the modeler 12, reference signals are parameterized via various modeling techniques (such as statistical modeling using parametric distributions). The features are thus transformed into models.

A matcher 13 takes the parameterized input features (i.e. a model) and performs a series of calculations to compare the signal with existing references, available either as features or as models. As a result, a matcher typically produces a value that corresponds to the extent of match of the two signals, i.e. a "score."

In the thresholder 14, a binary decision is made based on the score generated by the matcher 13 previously. This is typically implemented as a threshold operation, e.g. if the score is larger than a predetermined threshold, the hypothesis is accepted, otherwise it is rejected.

An example speaker detection system with a design structure consistent with the functional levels shown in FIG. 1 is applied as follows. At the time of the initial tuning only two different acoustic conditions are considered; (US-national) landline, and cellular transmission type. The initial system is tuned for these two conditions correspondingly using above-mentioned standard techniques. The overall score distribution of the matcher 13 is centered around the zero point for negative tests (i.e. test with a "reject" outcome) on the score axis. The system 1 is use with some initial number of enrolled users but the number is steadily growing. A number of the users, however, enroll over landline phones from overseas (Europe and Japan) and also some users use IP-phones, in both cases a mismatch is created with the tuned detection system which results in a worse-than-expected performance. In a typical scenario the system would need to be retuned in a supervised fashion using the data collected and properly labeled by condition and speaker.

Figure 2:
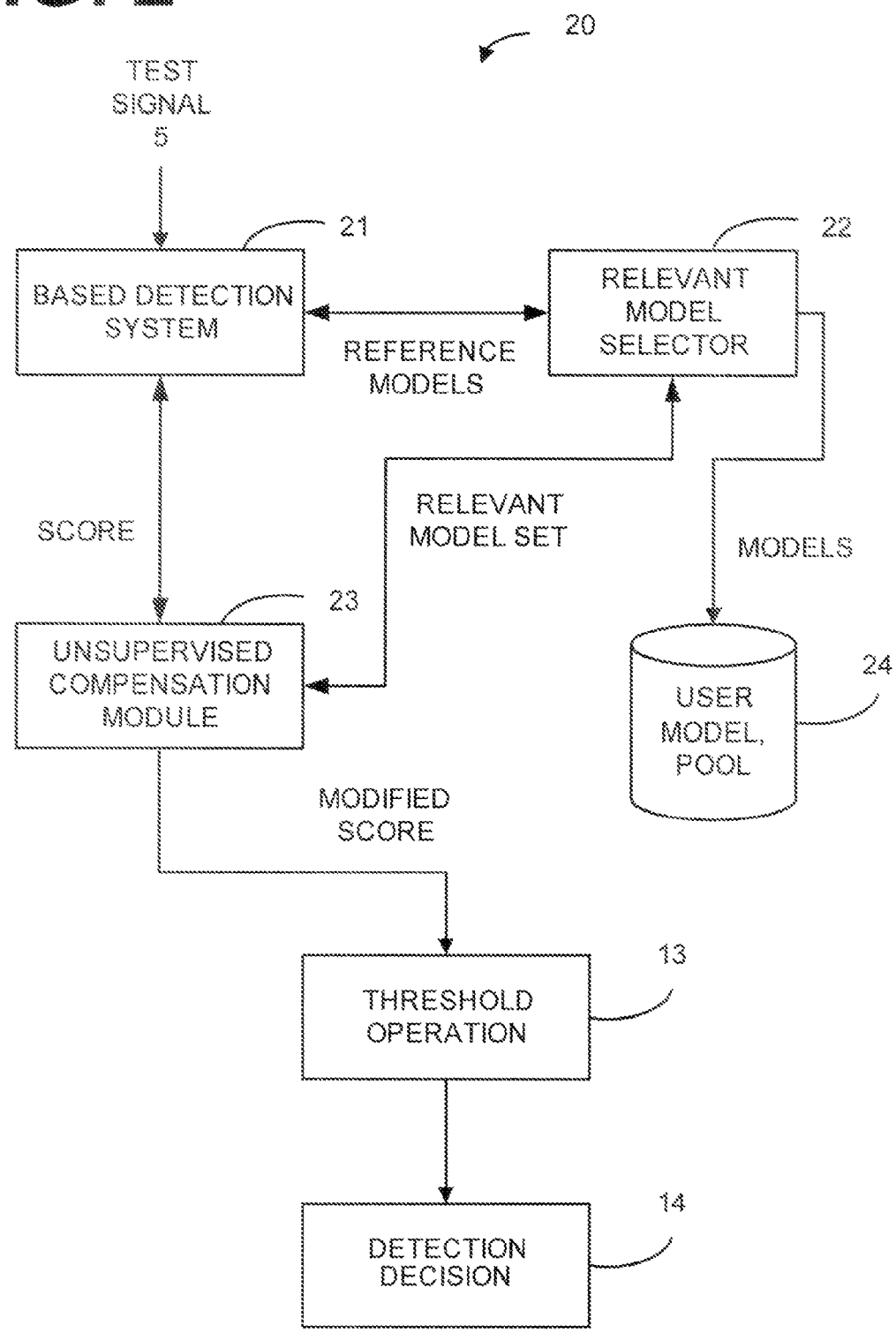
FIG. 2 illustrates one example of a compensation apparatus of the present invention.

Turning now to the drawings in greater detail, it will be seen that in FIG. 2 there is a description of the detection system 20 of the present invention that exemplifies the procedure in a setting for speaker detection. The invention uses a continuous adaptation and a compensation module 22, such that untreated distortions propagating through the base detection system 21 are compensated for, including originally unpredicted new conditions. The compensation may be performed on all levels.

FIG. 2 shows a detection system 20 incorporating the present invention. The detection system 20 includes a physical machine (not shown) coupled via a network adapter (not shown) to a network (not shown) A physical machine is a data processing system suitable for storing and/or executing program code will include at least one processor coupled directly or indirectly to memory elements (not shown) through a system bus (not shown). The memory elements can include local memory employed during actual execution of the program code, bulk storage, and cache memories which provide temporary storage of at least some program code in order to reduce the number of times code must be retrieved from bulk storage during execution. Input/output or I/O devices (including, but not limited to keyboards, displays, pointing devices, etc.) can be coupled to the system directly or through intervening I/O controllers. Network, adapters may also be coupled to the system to enable the physical machine to become coupled to other data processing systems or remote printers or storage devices through intervening private or public networks, modems, cable modem and ethernet cards are just a few of the currently available types of network, adapters.

Network may be network such as but not limited to: the Internet, a local area network (LAN), a wide area network (WAN), a telephone line with or without a modem or other like networks. The physical machine has its own operating system (OS), for example, an instance of the IBM z/OS™, z/VM™ operating system or a UNIX™ based operating system such as the Linux™ operating system (z/OS and z/VM are trademarks of IBM Corporation; UNIX is a registered trademark of The Open Group in the United States and other countries; Linux is a trademark of Linus Torvalds in the United States, other countries, or both).

In an alternative embodiment, where the detection system 20 is implemented in hardware, the detection system 20 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one exemplary embodiment, the compensation occurs at the score level output from base detection module 21 thus bringing the advantage of universal applicability to any detection system 20 (i.e. viewing a base detection module 21 as a black box that generates a score as its output). The compensation is performed via collecting information from data gathered continuously during the typical usage of the detection system 20 In an unsupervised fashion, in the form of other-than-target models and data. Other-than-target model refers to a model of an event (such as for example, but is not limited to, speaker identity, language, etc.) that is not involved in the current test. Examples of other-than-target data include, but are not limited to, voice models of users other than the user currently being detected or other languages other than current target language.

The advantage of re-using such data that is stored in the user model pool 24, which is typically disregarded in current detection systems, is in capturing the potentially new conditions under which the recordings are made. In an exemplary speaker detection system 20, for example, new acoustic conditions are automatically discovered, such as a new type of telephone device, say a PC-based IP-phone. In the detections system of the present invention, the number of detection classes, stored in user model pool 24, may grow with time. For example, the number of user voice models grows as more users enroll into the system. In the present invention the data from all enrolled users form a set, stored in user model pool 24, from which adaptation data is drawn in order to derive the compensation procedure. In contrast, the current compensation techniques (as cited above) typically rely on a held-out data set along with labels for each condition thus limiting the number of conditions only to labels and data known and available at the time of system tuning.

The present invention takes advantage of an unsupervised use of the existing other-than-target user data to derive parametric and non-parametric compensation values for the score distribution for the current user.

In the non-parametric case, the compensation is achieved by a histogram matching procedure on histograms of scores that were calculated using the test recording scored on a selected set (model selector 23 in FIG. 2) of other user models in the user model pool 24 (i.e. other-than-target voice models). These other user models in user model pool 24 were recently created with a prescribed canonic histogram (such as that of the normal distribution) using a ranking procedure (i.e. the new (compensated) score is obtained via the numerical value corresponding to its rank among the ranked selected set of concurrent models. More formally, having N models, we approximate the normal Cumulative Distribution Function (CDF) as $$\Phi = \frac{r - 1/2}{N}$$

where r is the rank of the annormed scores within the N scores. Then the new (normed) score $\chi$ value can be found by table lookup corresponding to the value of the normal CDF $$\Phi = \int_{-\infty}^{\chi} \frac{1}{\sqrt{2\pi}} \exp\left(-\frac{z^2}{2}\right) dz$$

In the parametric case the canonic distribution is considered to come from a parametric family of distributions (e.g. the Gaussian distribution) and is modeled by the unsupervised compensation module 22 in terms of their statistical parameters. The parameters (e.g. the first and second-order moments, (i.e. the mean and standard deviation)) are obtained from scores of the models, from relevant model selector 23, selected from a population of relevant speaker models, stored in user model pool 24. These relevant speaker models could be for example from those recently created or used. The parameters are then used to transform the test scores (in the above example, to shift and to scale the test score) in order to obtain a modified (compensated) score. The compensation parameters generated by the unsupervised compensation module 22 (e.g. the mean and standard deviation) change depending on the set of speaker models determined to be relevant (for example with the most variety, or those recently used, etc.). More formally, an original score x is transformed into a new score $\chi$ by means of the mean parameter m and deviation s:

$$\hat{x} = \frac{x - m}{s}$$

where m and s are estimated from the N relevant model scores. Note that any other (in general non-linear) function may be a suitable candidate for a transformation function as long as it has the desired effect of stabilizing the score distribution across conditions.

The above-described procedure results in normalizing the detection system behavior in the sense that it continually produces scores distributed according to a prescribed canonical distribution. For example, centered around a predetermined value on the score axis and hence mitigates the adverse effects of scores being distorted and lying off the pre-set operating point by the supplied threshold. The technique achieves this by continually using the most relevant other-than-target models (e.g. other enrolled speakers in a speaker verification system) and by deriving compensation from scores generated by such selected models.

The present invention can take the form of an entirely hardware embodiment, an entirely software embodiment or an embodiment containing both hardware and software elements. As one example, one or more aspects of the present invention can be included in an article of manufacture (e.g. one or more computer program products) having, for instance, computer usable media. The media has embodied therein, for instance, computer readable program code means for providing and facilitating the capabilities of the present invention. The article of manufacture can be included as a part of a computer system or sold separately.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A detection compensation system comprising:
   a base detection system to receive an acoustic signal and to output an uncompensated score indicative of an extent of match between at least one feature extracted from the acoustic signal and a target reference; and
   a compensation module to compensate for presence of distortion that impacts the uncompensated score, the compensation module using at least one processor to generate a compensated score based on the uncompensated score and a plurality of models, the plurality of models comprising a target model for the target reference and at least one non-target model for at least one non-target reference.

2. The detection compensation system of claim 1, wherein:
   the base detection system comprises a speaker verification system configured to verify whether a speaker of the acoustic signal is a target speaker, wherein the target speaker is enrolled in the speaker verification system
   the target reference comprises information indicative of the target speaker;

the at least one non-target reference comprises information indicative of at least one non-target speaker enrolled in the speaker verification system; and the target model comprises a target voice model for the target speaker and the at least one non-target model comprises at least one non-target voice model for the at least one non-target speaker.

3. The detection compensation system of claim 2, wherein:
the acoustic signal is recorded in a first acoustic environment characterized by a first set of acoustic conditions;
the base detection system is tuned for a second acoustic environment characterized by a second set of acoustic conditions; and
at least one acoustic condition in the first set of acoustic conditions is not in the second set of acoustic conditions.

4. The detection compensation system of claim 3, wherein:
the first set of acoustic conditions comprises IP telephone conditions; and
the second set of acoustic conditions comprises landline telephone conditions and/or cellular telephone conditions.

5. The detection compensation system of claim 1, wherein:
the base detection system comprises a language detection system configured to detect whether a language of the acoustic signal is a target language;
the target reference comprises information indicative of the target language;
the non-target reference comprises information indicative of at least one non-target language; and
the target model comprises a language model for the target language and the at least one non-target model comprises at least one non-target language model for the at least one non-target language.

6. The detection compensation system of claim 1, wherein the compensation module generates the compensated score by using a histogram-matching procedure.

7. The detection compensation system of claim 1, wherein the detection compensation system outputs a detection decision if the compensated score is below a threshold.

8. The detection compensation system of claim 1, wherein the base detection system comprises:
a feature extractor to extract the at least one feature from the acoustic signal; and
a matcher to compute the uncompensated score based on the extent of the match between the at least one feature and the target reference.

9. The detection compensation system of claim 1, wherein the at least one feature comprises at least a portion of the acoustic signal.

10. A method comprising:
receiving an acoustic signal from a remote device;
obtaining, from a base detection system, an uncompensated score indicative of an extent of match between at least one feature extracted from the acoustic signal and a target reference; and
compensating for presence of distortion that impacts the uncompensated score by using at least one processor to generate a compensated score based on the uncompensated score and a plurality of models, the plurality of models comprising a target model for the target reference and at least one non-target model for at least one non-target reference.

11. The method of claim 10, wherein the method further comprises updating the plurality of models to capture a new acoustic environment in which the acoustic signal is recorded.

12. The method of claim 10, wherein the method further comprises updating the plurality of models to include a new model descriptive of a new acoustic environment in which the acoustic signal is recorded.

13. The method of claim 10, wherein the remote device is at least one device selected from the group consisting of a landline telephone, a cellular telephone, a PDA, and a PC-enabled IP phone.

14. The method of claim 10, wherein:
the base detection system comprises a speaker verification system configured to verify whether a speaker of the acoustic signal is a target speaker, wherein the target speaker is enrolled in the speaker verification system;
the target reference comprises information indicative of the target speaker;
the at least one non-target reference comprises information indicative of at least one non-target speaker enrolled in the speaker verification system; and
the target model comprises a target voice model for the target speaker and the at least one non-target model comprises at least one non-target voice model for the at least one non-target speaker.

15. The method of claim 10, wherein:
the base detection system comprises a language detection system configured to detect whether a language of the acoustic signal is a target language;
the target reference comprises information indicative of the target language;
the non-target reference comprises information indicative of at least one non-target language; and
the target model comprises a language model for the target language and the at least one non-target model comprises at least one non-target language model for the at least one non-target language.

16. A computer-readable storage medium storing computer program instructions that, when executed, perform a method comprising:
receiving an acoustic signal;
obtaining, from a base detection system, an uncompensated score indicative of an extent of match between at least one feature extracted from the acoustic signal and a target reference; and
compensating for presence of distortion that impacts the uncompensated score by generating a compensated score based on the uncompensated score and a plurality of models, the plurality of models comprising a target model for the target reference and at least one non-target model for at least one non-target reference.

17. The computer-readable storage medium of claim 16, wherein:
the base detection system comprises a speaker verification system configured to verify whether a speaker of the acoustic signal is a target speaker, wherein the target speaker is enrolled in the speaker verification system;
the target reference comprises information indicative of the target speaker;
the at least one non-target reference comprises information indicative of at least one non-target speaker enrolled in the speaker verification system; and
the target model comprises a target voice model for the target speaker and the at least one non-target model comprises at least one non-target voice model for the at least one non-target speaker.

18. The computer-readable storage medium of claim 16, wherein:

the base detection system comprises a language detection system configured to detect whether a language of the acoustic signal is a target language;
the target reference comprises information indicative of the target language;
the non-target reference comprises information indicative of at least one non-target language; and
the target model comprises a language model for the target language and the at least one non-target model comprises at least one non-target language model for the at least one non-target language.

\* \* \* \* \*